United States Patent
Angkititrakul et al.

(10) Patent No.: US 10,298,132 B2
(45) Date of Patent: May 21, 2019

(54) SWITCHING POWER SUPPLY FOR LOW STEP DOWN CONVERSION RATIO WITH REDUCED SWITCHING LOSSES

(71) Applicant: Intersil Americas LLC, Milpitas, CA (US)

(72) Inventors: Sitthipong Angkititrakul, Fremont, CA (US); Jian Yin, San Ramon, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 34 days.

(21) Appl. No.: 15/680,033

(22) Filed: Aug. 17, 2017

(65) Prior Publication Data

US 2018/0109174 A1    Apr. 19, 2018

Related U.S. Application Data

(60) Provisional application No. 62/407,970, filed on Oct. 13, 2016.

(51) Int. Cl.
*H02M 3/158*    (2006.01)
*H02M 1/08*     (2006.01)
(Continued)

(52) U.S. Cl.
CPC .......... *H02M 3/1588* (2013.01); *H02M 1/083* (2013.01); *H02M 1/44* (2013.01);
(Continued)

(58) Field of Classification Search
CPC .... H02M 3/155–3/1588; H02M 1/083; H02M 1/44; H02M 2001/0058
See application file for complete search history.

(56) References Cited

U.S. PATENT DOCUMENTS 4,931,716 A * 6/1990 Jovanovic ........... H02M 3/1582
                                                          323/224
5,072,355 A * 12/1991 Huillet ................ H02M 1/4241
                                                          323/283
(Continued)

OTHER PUBLICATIONS

Yao, Kaiwei et al., "Tapped-Inductor Buck Converter for High-Step Down DC-DC Conversion", IEEE Transactions on Power Electronics, vol. 20, No. 4, Jul. 2005, pp. 775-780.
(Continued)

*Primary Examiner* — Yusef A Ahmed
(74) *Attorney, Agent, or Firm* — Foley & Lardner LLP

(57) ABSTRACT

Disclosed herein is a power converter with low step down conversion ratio with improved power conversion efficiency. The power converter includes a first inductor to receive the input voltage, and a second inductor to supply the output voltage to a load. The first inductor and the second inductor are electromagnetically coupled to each other. The power converter further includes a first switch coupled between the first inductor and the second inductor. The first switch is switched according to a pulse having a frequency corresponding to a resonant frequency of (i) a series inductance between the first inductor and the second inductor and (ii) a parallel capacitance across the first switch. The power converter further includes a second switch coupled to the first switch and the second inductor to supply a reference voltage to the second inductor according to another pulse having the frequency.

16 Claims, 3 Drawing Sheets

(51) Int. Cl.
*H02M 1/44* (2007.01)
*H02M 1/00* (2006.01)

(52) U.S. Cl.
CPC ............. *H02M 2001/0054* (2013.01); *H02M 2001/0058* (2013.01); *Y02B 70/1425* (2013.01); *Y02B 70/1466* (2013.01); *Y02B 70/1491* (2013.01)

(56) References Cited

U.S. PATENT DOCUMENTS

| | | | | |
|---|---|---|---|---|
| 5,642,267 | A * | 6/1997 | Brkovic | G05F 1/613 323/224 |
| 5,736,842 | A * | 4/1998 | Jovanovic | H02M 1/34 323/222 |
| 6,259,234 | B1 * | 7/2001 | Perol | H02J 7/35 323/222 |
| 6,429,628 | B2 * | 8/2002 | Nakagawa | H02M 1/34 323/224 |
| 6,486,642 | B1 * | 11/2002 | Qian | H02M 3/158 323/255 |
| 6,507,174 | B1 * | 1/2003 | Qian | H02M 1/34 323/222 |
| 6,989,997 | B2 * | 1/2006 | Xu | H02M 3/158 323/271 |
| 7,138,789 | B2 * | 11/2006 | Moussaoui | H02M 3/1584 323/272 |
| 9,602,005 | B2 * | 3/2017 | Xiao | H02M 3/1584 |
| 9,780,637 | B2 * | 10/2017 | Liu | H02M 1/08 |
| 9,847,718 | B2 * | 12/2017 | Sturcken | H02M 3/158 |
| 2002/0185993 | A1 * | 12/2002 | Qian | H02M 3/158 323/282 |
| 2004/0123166 | A1 * | 6/2004 | Gauthier | G06F 1/26 713/300 |
| 2005/0156579 | A1 * | 7/2005 | Moussaoui | H02M 3/1584 323/224 |
| 2008/0204839 | A1 * | 8/2008 | Murakami | G02B 26/085 359/199.1 |
| 2009/0262557 | A1 * | 10/2009 | Asuke | H02M 3/1582 363/18 |
| 2010/0128498 | A1 * | 5/2010 | Nymand | H02M 3/335 363/17 |
| 2010/0253310 | A1 * | 10/2010 | Fonderie | H02M 7/537 323/311 |
| 2015/0241863 | A1 * | 8/2015 | Lewin | H04R 1/005 700/275 |
| 2015/0303806 | A1 * | 10/2015 | Madsen | H02M 7/5383 323/271 |
| 2016/0036330 | A1 * | 2/2016 | Sturcken | H02M 3/1584 323/271 |
| 2016/0322910 | A1 * | 11/2016 | Kovacevic | H02M 3/33576 |
| 2016/0373001 | A1 * | 12/2016 | Liu | H02M 1/08 |
| 2017/0294840 | A1 * | 10/2017 | Madsen | H02M 3/3385 |

OTHER PUBLICATIONS

Yao, Kaiwei et al., "Tapped-Inductor Buck Converters with a Lossless Clamp Circuit", 2002 IEEE, pp. 693-698.

Park, J.H. et al., "Non-isolation Soft-switching Buck Converter with Tapped-inductor for Wide-input Extreme Step-down Applications", 2005 IEEE, pp. 1941-1946.

Park, Jong-Hu et al., "The Zero Voltage Switching (ZVS) Critical Conduction Mode (CRM) Buck Converter with Tapped-Inductor", 2003 IEEE, pp. 1077-1081.

* cited by examiner

SWITCHING POWER SUPPLY FOR LOW STEP DOWN CONVERSION RATIO WITH REDUCED SWITCHING LOSSES

CROSS-REFERENCE TO RELATED APPLICATION

The present application claims priority to U.S. Provisional Application No. 62/407,970 filed Oct. 13, 2016, which is incorporated by reference herein in its entirety.

TECHNICAL FIELD

Embodiments of the present disclosure relate generally to power converters, and more particularly to switching power converters utilizing a tapped (coupled) inductor to achieve low step down conversion ratio, and utilizing parasitic inductance and capacitance to reduce switching loss, hence, improve power conversion efficiency.

BACKGROUND

A power converter is a circuit component that supplies electric power from a power source to a load. Some power converter converts a direct current (DC) voltage from a power source into a lower DC voltage to provide the lower DC voltage to a load. For example, a power converter receives a high direct current (DC) voltage (e.g., 50V) from a power source, and converts the high DC voltage into a lower DC voltage (e.g., 1V) for powering consumer electronics (e.g., laptops, tablet computers, mobile phones, or any electronic circuit).

Some power converters implement transformers or tapped inductors to improve a step down conversion ratio capability from the DC input voltage to the DC output voltage. In particular, energy transferred through electromagnetic coupling between two inductors in a switching power converter allows a large voltage difference between the DC input voltage and the DC output voltage. However, leakage inductance (also referred to as a parasitic inductance herein) of the tapped inductors may induce high voltage spikes or oscillations across the switching devices. Such voltage spikes or oscillations may result in power loss, and reduce power conversion efficiency. Moreover, such voltage spikes or oscillations may increase radiated electromagnetic interference (EMI) noise.

SUMMARY

The present embodiments relate generally to a switching power converter with low step down ratio capability. In one or more embodiments, the switching power converter implements electromagnetically coupled inductors for improving (or reducing) step down conversion ratio between an input voltage and an output voltage, where a parasitic inductance of the electromagnetically coupled inductors is resonated with a capacitance such that switching devices can be turned on when voltages across the switching devices are approximately zero voltage.

In accordance with these and other aspects, embodiments disclosed herein include a power converter to convert an input voltage into an output voltage. In one or more embodiments, the power converter includes: a first inductor to receive the input voltage; a second inductor electromagnetically coupled to the first inductor, the second inductor to supply the output voltage to a load; a first switch coupled between the first inductor and the second inductor, the first switch being switched according to a pulse having a frequency corresponding to a resonant frequency of (i) a series inductance between the first inductor and the second inductor and (ii) a parallel capacitance across the first switch; and a second switch coupled to the first switch and the second inductor to supply a reference voltage to the second inductor according to another pulse having the frequency.

One or more embodiments disclosed herein are related to a method for converting an input voltage into an output voltage. In one or more embodiments, the method includes controlling switching devices for periodically coupling the input voltage to the output voltage. The method further includes interposing electromagnetically coupled inductors for improving a step down conversion ratio between the input voltage and the output voltage. The method further includes configuring a parasitic inductance of the electromagnetically coupled inductors so as to resonate with a capacitance such that the switching devices can be turned on when voltages across the switching devices are approximately zero voltage.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
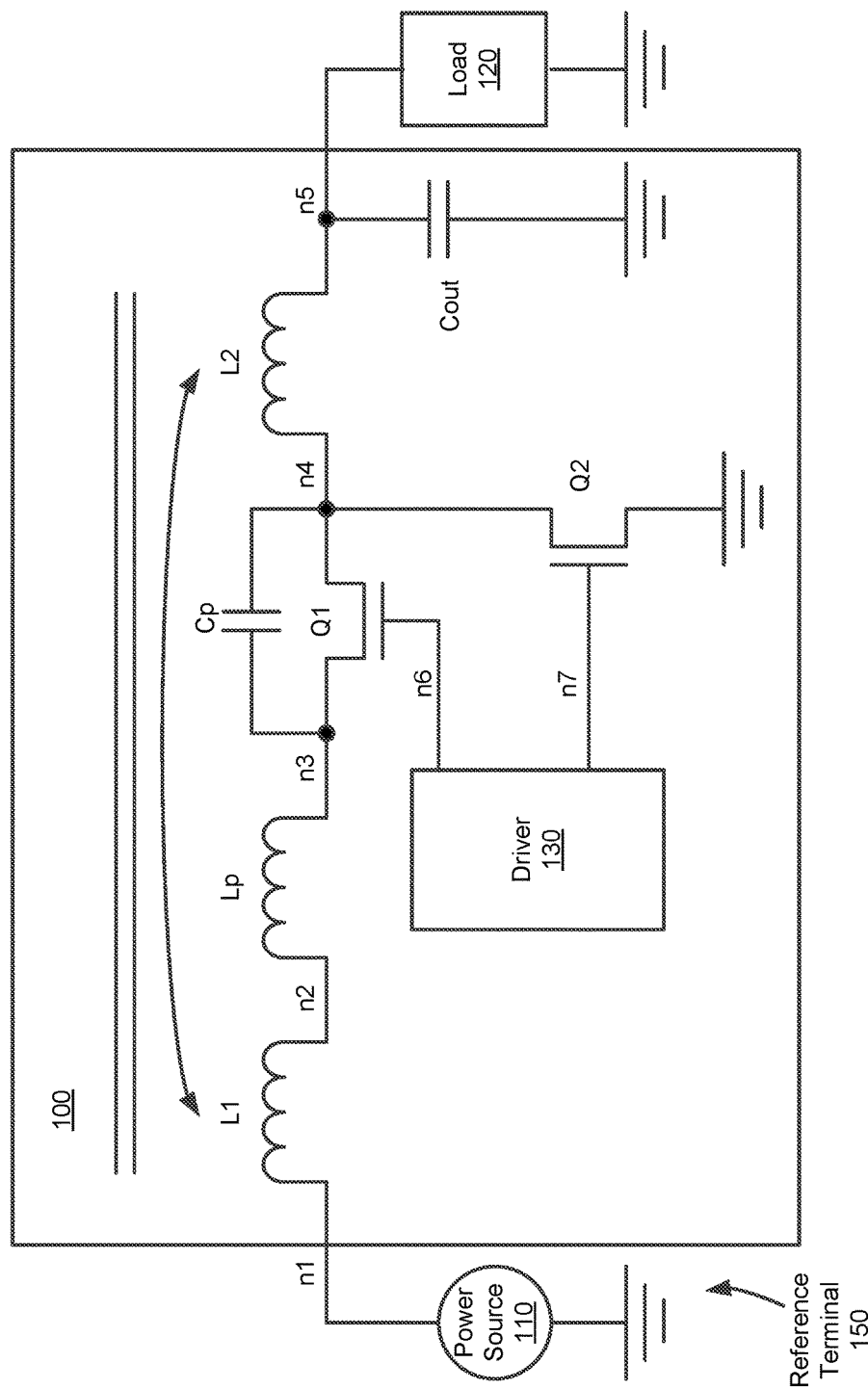
FIG. 1 is a block diagram of an example switching power converter, according to one or more embodiments.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Overview

According to certain general aspects, a switching power converter with low step down ratio capability is described. More particularly, the switching power converter implements electromagnetically coupled inductors for improving (or reducing) step down conversion ratio between an input voltage and an output voltage, where a parasitic inductance of the electromagnetically coupled inductors is resonated with a capacitance such that switching devices can be turned on when voltages across the switching devices are approximately zero voltage.

In one or more embodiments, the switching power converter includes a first inductor and a second inductor electromagnetically coupled to each other, a first switch coupled between the first inductor and the second inductor, and a second switch coupled to the first switch and the second inductor. The first switch is switched according to a pulse controlled by a feedback circuit to regulate the output voltage to a desired level. The second switch may be switched complementarity to the first switch. As a result, the disclosed switching power converter enables a large voltage difference between the input voltage and the output voltage through electromagnetic coupling between two inductors.

In one aspect, the series inductance includes at least a parasitic inductance of the first inductor. Thus, the parasitic inductance may be selected to resonate with a capacitance (e.g., a parasitic capacitance, an intentional capacitance of a capacitor or a combination of them). Resonating of the parasitic inductance and the capacitance causes the voltage across a switching device to have a sinusoidal wave shape, which helps reduce voltage spikes. The sinusoidal wave shape across the capacitance allows the switching device to be turned on with a low voltage across the switching device (e.g., 0~1.0V), thereby obviating power loss. As a result, the disclosed switching power converter enables a large voltage difference between the input voltage and the output voltage through electromagnetic coupling between two inductors with improved power conversion efficiency.

Example Switching Power Converter

FIG. 1 is a block diagram of an example switching power converter 100, according to one or more embodiments. The switching power converter 100 is coupled to a power source 110 and a load 120 through conductive lines or traces, for example. The power source 110 may be a battery, power outlet, a power adapter, or any circuit supplying an input voltage to the switching power converter 100. The load 120 may be a laptop, a tablet computer, a mobile phone, or any electronic circuit receiving an output voltage from the switching power converter 100. The switching power converter 100 receives the DC input voltage, converts the DC input voltage into the DC output voltage, and supplies the output voltage to the load 120. In one aspect, the switching power converter 100 performs a voltage conversion with a small step down ratio (e.g., less than 1/50 to 1/5) between the input voltage and the output voltage with improved power conversion efficiency. A step down ratio herein refers to a ratio between a DC output voltage and a DC input voltage (i.e., Vout/Vin).

In one or more embodiments, the switching power converter 100 includes a first inductor L1, a second inductor L2, a series inductance Lp, a parallel capacitance Cp, a first transistor Q1, a second transistor Q2, a driver 130, and an output capacitor Cout. These components may be implemented as an integrated circuit, discrete components on a printed circuit board, or any combination of them. These components operate together to convert the DC input voltage from the power source 110 into a DC output voltage, and supply the DC output voltage to the load 120. In some embodiments, the switching power converter 100 includes different, fewer, or additional components or in different arrangements than shown in FIG. 1. For example, the driver 130, the output capacitor Cout, or both may be implemented as external components separate from other components of the switching power converter 100.

In one aspect, the components of the switching power converter 100 are configured as a zero voltage switching tapped inductor buck converter. In one implementation, the first inductor L1 may be coupled to the power source 110 at node n1 and is coupled to a series inductance Lp at node n2. The series inductance Lp is coupled to a first transistor Q1 and a parallel capacitance Cp at node n3. The first transistor Q1 and the parallel capacitance Cp are coupled to the second inductor L2 and the second transistor Q2 at node n4. The second inductor L2 is coupled to the output capacitor Cout at node n5 and may be coupled to the load 120. The second transistor Q2 and the output capacitor Cout are coupled to a reference terminal 150 at which a reference voltage (e.g., ground voltage) is supplied. The first transistor Q1 and the second transistor Q2 are coupled to the driver 130 at nodes n6, n7, respectively.

The first inductor L1 and the second inductor L2 are circuit components coupled between an input and an output of the switching power converter 100. In one configuration, the first inductor L1 includes one end coupled to the node n1 and another end coupled to the node n2, and the second inductor L2 includes one end coupled to the node n5 and another end coupled to the node n4. The first inductor L1 may receive a DC input voltage for the switching power converter 100 at the node n1, and the second inductor L2 may supply a DC output voltage for the switching power converter 100 at the node n5. The inductors L1, L2 may be implemented as a coupled or tapped inductors, thus the inductors L1, L2 are electromagnetically coupled to each other. In one aspect, a number of turns of the first inductor L1 and a number of turns the second inductor L2 determine a step down ratio as shown in Eq. (1) below:

$$\text{Step Down Ratio} = \frac{V_{out}}{V_{in}} = \frac{T_{on}N_2}{T_{off}N_1 + (T_{on} + T_{off})N_2} \quad \text{Eq. (1)}$$

where N1 is a number of turns (or windings) of the first inductor L1 and N2 is a number of turns (or windings) of the second inductor L2, Ton is a duration of the on-time of the transistor Q1, and Toff is a duration of the off-time of the transistor Q1.

The series inductance Lp is a circuit model coupled between the inductors L1, L2. The series inductance Lp includes one end coupled to the node n2 and another end coupled to the node n3. The series inductance Lp includes at least a parasitic inductance (also referred to as a "leakage inductance" herein) of the tapped (coupled) inductor. The series inductance Lp may additionally include an inductance of a discrete inductor physically coupled between the nodes n2, n3, in series with the leakage inductance. In case the additional discrete inductor is implemented, the series inductance Lp represents a sum of the parasitic inductance and the inductance of the discrete inductor.

The first transistor Q1 is a circuit component coupled between the series inductance Lp and the inductor L2. In one approach, the first transistor Q1 is implemented as an n-type or a p-type field effect transistor (i.e. MOSFET). The first transistor Q1 may be implemented as another type of switching power transistor. The first transistor Q1 includes a first end (e.g., drain) coupled to the node n3, a second end (e.g., source) coupled to the node n4, and a third end (e.g., gate) coupled to the node n6. In one aspect, the first transistor Q1 operates as a switch electrically coupling or decoupling the node n3 to the node n4, according to a control signal applied at the node n6. Specifically, the first transistor Q1 electrically couples the node n3 to the node n4, in response to a voltage at the node n6 being a first voltage. Similarly, the first transistor Q1 electrically decouples the node n3 from the node n4, in response to a voltage at the node n6 being a second voltage. By implementing the first transistor Q1 between the nodes n3, n4, the implementation of the driver 130 can be simplified.

The parallel capacitance Cp is a circuit model coupled in parallel across two ends (e.g., drain and source) of the first transistor Q1. The parallel capacitance Cp includes one end coupled to the node n3 and another end coupled to the node n4. The parallel capacitance Cp includes at least a parasitic capacitance of the first transistor Q1. The parallel capacitance Cp may additionally include a capacitance of a discrete capacitor physically coupled between the nodes n3, n4, in parallel with the parallel capacitance Cp. In case the additional discrete capacitor is implemented, the parallel capacitance Cp represents a sum of the parasitic capacitance and the capacitance of the discrete capacitor. In one aspect, the parallel capacitance Cp resonates with the series inductance Lp at a resonant frequency of the parallel capacitance Cp and the series inductance Lp to help reduce the turn-on transition losses of the first transistor Q1 and hence improve power conversion efficiency as described in detail below with respect to FIGS. 2 through 4.

The second transistor Q2 is a circuit component coupled to the first transistor Q1 and the second inductor L2. In one approach, the second transistor Q2 is implemented as an n-type or a p-type field effect transistor (i.e. MOSFET). The second transistor Q2 may be implemented as another type of switching power transistor. The second transistor Q2 includes a first end (e.g., drain) coupled to the node n4, and a second end (e.g., source) coupled to the reference terminal 150. In one aspect, the second transistor Q2 operates as a switch electrically coupling or decoupling the node n4 to the reference terminal 150, according to another control signal applied at the node n7. Specifically, the second transistor Q2 electrically couples the node n4 to the reference terminal 150, in response to a voltage at the node n7 being a first voltage. Similarly, the second transistor Q2 electrically decouples the node n4 from the reference terminal 150, in response to a voltage at the node n7 being a second voltage.

The driver 130 is a circuit component that generates signals for operating the first transistor Q1 and the second transistor Q2. The driver 130 includes a first output coupled to the node n6 and a second output coupled to the node n6. In one aspect, the driver 130 generates pulses at a particular frequency, and applies the pulses to the nodes n6, n7 (e.g., each having a corresponding pulse width). In one approach, the driver 130 generates pulses to turn on the first transistor Q1 and turn off the second transistor Q2 during a first time period, and turn off the first transistor Q1 and turn on the second transistor Q2 during a second time period. In case the first transistor Q1 is implemented as an n-type transistor and the second transistor Q2 is implemented as a p-type transistor, or the first transistor Q1 is implemented as a p-type transistor and the second transistor Q2 is implemented as an n-type transistor, the nodes n6, n7 may be coupled to each other and the driver 130 may output a single pulse. Example pulses generated by the driver 130 and operations of the switching power converter 100 are provided below with respect to FIGS. 2 and 3.

Figure 2A:
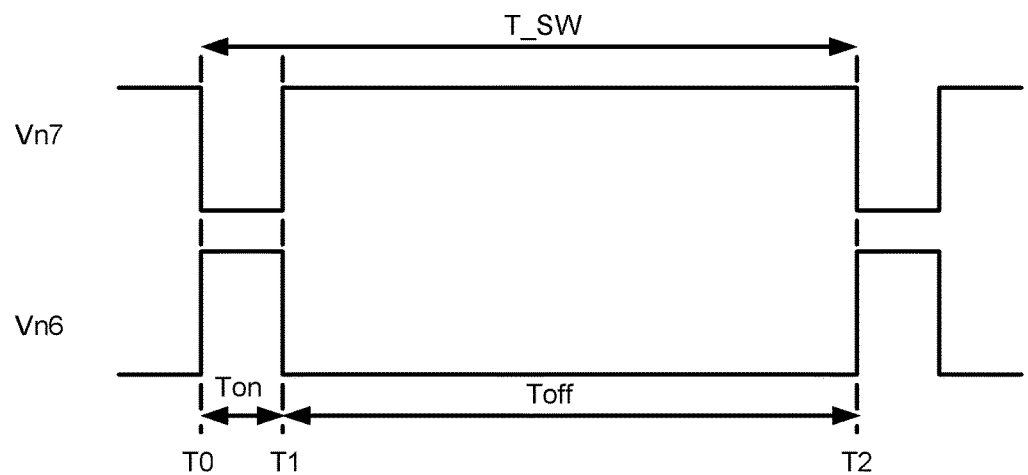
FIG. 2A illustrates example timing diagrams of pulses to operate a switching power supply, according to one or more embodiments.

Referring to FIG. 2A, illustrated are example timing diagrams of pulses Vn6, Vn7 to operate the switching power supply 100, according to one or more embodiments. In an embodiment in which the first transistor Q1 and the second transistor Q2 are implemented as n-type transistors, the driver 130 generates a first pulse Vn7 applied to the second transistor Q2 at the node n7 and a second pulse Vn6 applied to the first transistor Q1 at the node n6. The pulses Vn6, Vn7 are synchronized with a frequency or a time period T_SW between time T0 and T2. Within the time period T_SW, the pulse Vn6 has a high voltage and the pulse Vn7 has a low voltage during a time period between T0 and T1. In addition, the pulse Vn6 has a low voltage and the pulse Vn7 has a high voltage during a time period between T1 and T2. Accordingly, the first transistor Q1 is turned on and the second transistor Q2 is turned off during the time period between T0 and T1 (i.e., Ton of Q1), and the first transistor Q1 is turned off and the second transistor Q2 is turned on during the time period between T1 and T2 (i.e., Toff of Q1).

During the time period between T0 and T1, current flowing through both the first and second inductor L1, L2 increases, allowing energy to be stored at the second inductor L2, and the leakage inductance Lp. During the time period between T1 and T2, the stored energy in the second inductor L2 is transferred to the load. At the same time the stored energy in the leakage inductor Lp induces a resonance between the leakage inductor Lp and the parallel capacitance Cp. Assuming that the first inductor L1 and the series inductance Lp were omitted, a voltage difference or a step down ratio between the input voltage and the output voltage becomes proportional to a duty cycle of the pulses Vn6, Vn7. For example, a narrower time period between T0 and T1 (i.e. a smaller pulse width) allows the smaller step down conversion ratio.

To further improve a step down ratio beyond using a smaller pulse width, the first inductor L1 electromagnetically coupled to the second inductor L2 may be implemented. The turn ratio of the inductor windings N1/N2 allows the voltages across the inductors L1 and L2 to be coupled together and distributed between the inductors L1 and L2. In particular, the larger number N1 of windings of the first inductor L1 compared to the number N2 of windings of the second inductor L2 allows a lower step down ratio for the given pulse width that determines Ton and Toff, as shown in Eq. (1) above. As a result, a smaller step down ratio can be obtained by implementing the first inductor L1 electromagnetically coupled to the second inductor L2 compared to when the first inductor L1 is omitted.

Figure 2B:
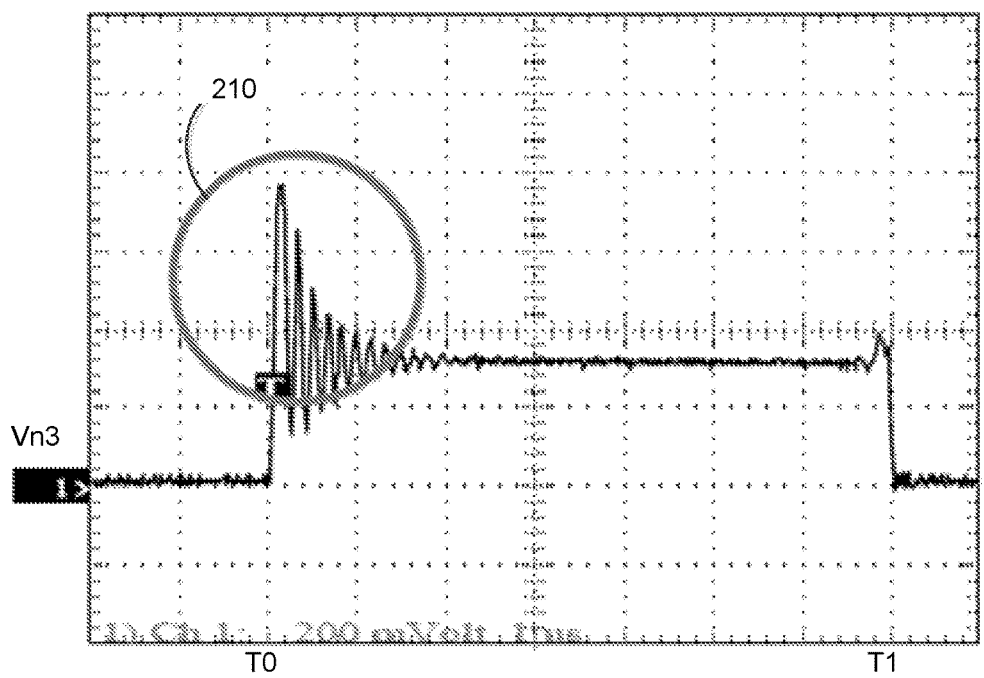
FIG. 2B is an example plot showing voltage spikes due to parasitic inductance, according to one or more embodiments.

The present applicants recognize that, although the first inductor L1 magnetically coupled to the second inductor L2 allows a smaller step down conversion ratio from the input voltage to the output voltage, a parasitic inductance of the tapped (coupled) inductor may introduce voltage spikes or oscillations. For example, FIG. 2B illustrates a plot showing a voltage at the node n3, in case the parallel capacitance Cp is too small (e.g., a few fF). As shown in FIG. 2B, voltage peaks 210 as shown in FIG. 2B may occur during the time period between T1 and T2 due to the parasitic inductance of the first inductor L1. These voltage peaks 210 result in power loss, thereby reducing power conversion efficiency. In addition, the voltage peaks 210 may increase radiated electromagnetic interference (EMI) noise.

In one or more embodiments, the parallel capacitance Cp is determined to resonate with the parasitic inductance or the series inductance Lp including the parasitic inductance. As described above with respect to FIG. 1, the parallel capacitance Cp may be a parasitic capacitance of the first transistor Q1, or a combination of the parasitic capacitance and a capacitance of a discrete capacitor coupled between the nodes n3, n4 across the first transistor Q1. The parallel capacitance Cp may be selected to resonate with the series inductance Lp such that the off-time Toff of the transistor Q1 from Eq. (1) is substantially equal to a half of the resonant period (i.e., an inverse of the resonant frequency of the parallel capacitance Cp and the series inductance Lp), or as shown in Eq. (2) below:

$$C_P = \frac{1}{L_P}\left(\frac{T_{off}}{\pi}\right)^2 \qquad \text{Eq. (2)}$$

Accordingly, the voltage across the parallel capacitor Cp (transistor Q1) has a sinusoidal wave shape. The voltage spikes may be suppressed. The transistor Q1 can be turned on with low voltage across a drain and a source of the transistor Q1 (e.g., 0~1.0V), and hence power loss can be reduced. Moreover, electromagnetic interference (EMI) noise due to the voltage spikes or oscillation can be decreased.

Figure 3:
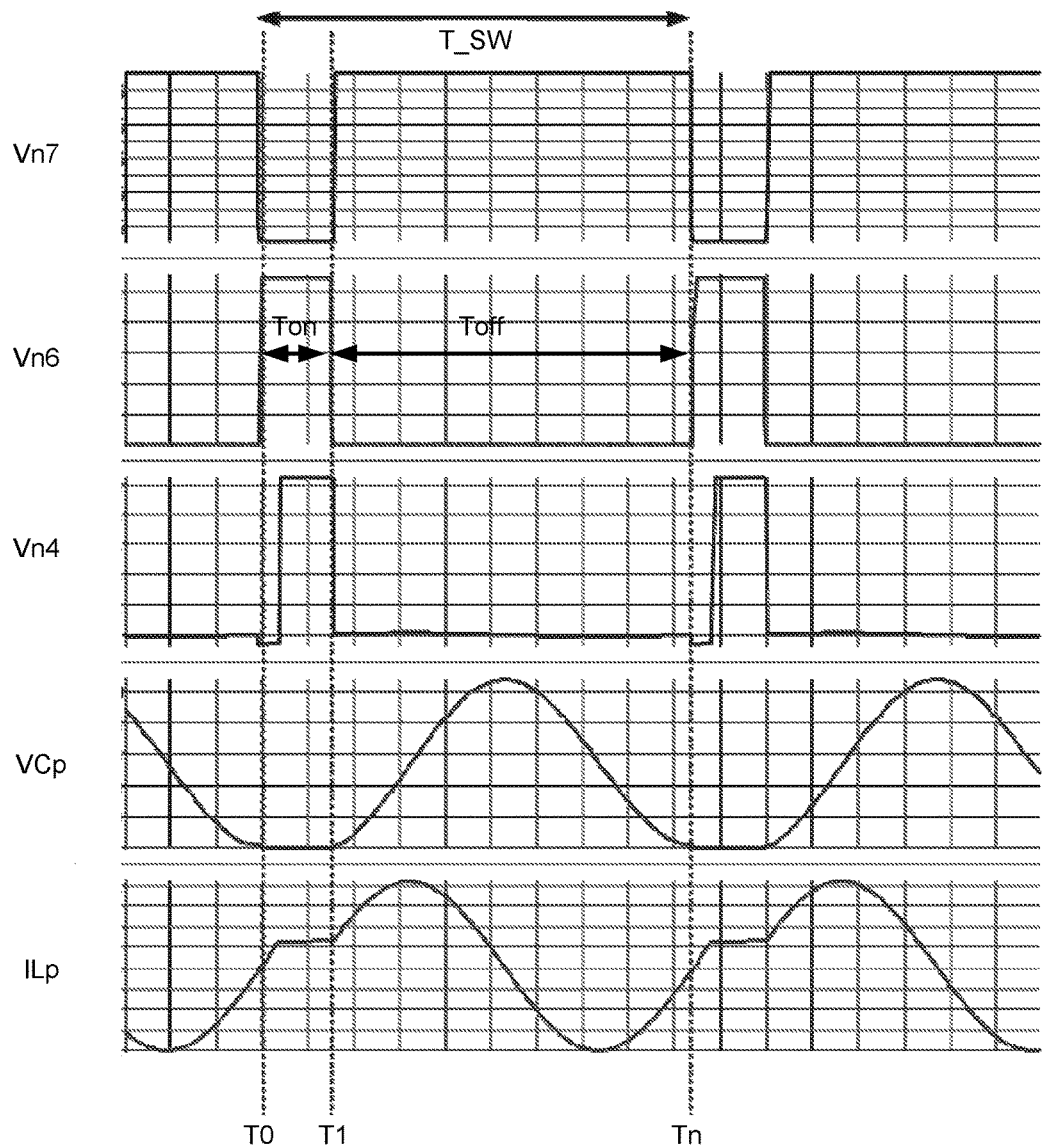
FIG. 3 illustrates example timing diagrams showing operating conditions of the switching power converter of FIG. 1, according to one or more embodiments.

Referring to FIG. 3, illustrated are example timing diagrams showing operating conditions of the switching power converter 100 of FIG. 1, according to one or more embodiments. In FIG. 3, a voltage plot Vn4 at node n4, a voltage plot VCp across the first transistor Q1 (or the parallel capacitance Cp), and a current plot ILp through the series inductance Lp, in response to the pulses Vn6, Vn7 applied from the driver 130 are shown. By implementing the parallel capacitance Cp and applying the pulses Vn6, Vn7 as shown in FIG. 3, the transistor Q1 can be turned on with low voltage across the transistor Q1, thereby decreasing power loss.

In one or more embodiments, the pulses Vn6, Vn7 are applied in accordance with a resonant frequency of the parallel capacitance Cp and the series inductance Lp. In one approach, the parallel capacitance Cp and the series inductance Lp resonate with each other at a resonant frequency as shown in the voltage plot VCp and the current plot ILp. During the time period between T0 and T1, the first transistor Q1 may be turned on and the second transistor Q2 may be turned off, when the VCp is substantially equal to 0V or within a particular range (e.g., 0~0.5V), or when a voltage at the node n3 and a voltage at the node n4 are substantially equal to each other. Accordingly, a current path from the power source 110 to the load 120 through the first transistor Q1 is enabled during the time period between T0 and T1, with a reduced voltage drop across the first transistor Q1. Turning on the first transistor Q1 with a reduced voltage across the nodes n3, n4 reduces the losses associated with turning-on of the transistor Q1. In one aspect, the voltage at node n3 corresponds to a sum of the voltage at node n4 and the voltage across the parallel capacitance Cp. The series inductance Lp and the parallel capacitance Cp can resonate with each other during the time period between T1 and T2. During the time period between T1 and T2, the first transistor Q1 may be turned off and the second transistor Q2 may be turned on. At time T1, when the first transistor Q1 is turned off, the energy stored in the series inductance Lp is smoothly transferred to the parallel capacitance Cp. Hence, voltage spikes or oscillation shown in FIG. 2B are reduced by implementing the parallel capacitance Cp, the series inductance Lp and switching the transistors Q1, Q2 as shown in FIGS. 1 and 3.

Advantageously, the disclosed switching power converter can achieve 3~4% higher power conversion efficiency than a conventional tapped inductor power converter employing a zero voltage switching using a conventional tapped inductor. In addition, the disclosed switching power converter can achieve 7~8% higher power conversion efficiency than a conventional buck power converter. Accordingly, the disclosed switching power converter 100 can improve power conversion efficiency with a smaller step down ratio (e.g., less than 10) and with a reduced energy loss due to the parasitic inductance of the first inductor of L1.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A power converter to convert an input voltage into an output voltage, the power converter comprising:
a first inductor comprising one end of the first inductor to receive the input voltage;
a second inductor, wherein the second inductor is commonly implemented with the first inductor as tapped inductors for improving a step down conversion ratio between the input voltage and the output voltage, and such that the second inductor is electromagnetically coupled to the first inductor, the second inductor comprising one end of the second inductor coupled to a load, the one end of the second inductor to supply the output voltage to the load;
a first switch coupled between another end of the first inductor and another end of the second inductor, the first switch being switched according to a pulse having a frequency corresponding to a resonant frequency of (i) a series inductance between the another end of the first inductor and the another end of the second inductor and (ii) a parallel capacitance across one end the first switch and another end of the first switch, wherein the series inductance is a combination of a parasitic inductance of the first inductor and an inductance of a discrete inductor coupled in series between the first inductor and the first switch; and
a second switch comprising one end of the second switch coupled to the another end of the first switch and the another end of the second inductor, the second switch to supply a reference voltage to the another end of the second inductor according to another pulse having the frequency, wherein the parasitic inductance of the series inductance is resonated with the parallel capacitance such that the first and second switches can be turned on when voltages across the first and second switches are approximately zero voltage.

2. The power converter of claim 1, further comprising: a driver configured to apply the pulse to the first switch and apply the another pulse to the second switch, the first switch to turn on during a first time period and turn off during a second time period according to the pulse, the second switch to turn off during the first time period and turn on during the second time period according to the another pulse.

3. The power converter of claim 2, wherein the driver is configured to turn on the first switch and turn off the second switch during the first time period, while a voltage at the one end of the first switch is substantially equal to a voltage at the another end of the first switch.

4. The power converter of claim 3, wherein the first time period is substantially equal to a half of a resonant period, the resonant period being an inverse of the resonant frequency.

5. The power converter of claim 1, wherein the parallel capacitance is a parasitic capacitance of the first switch.

6. The power converter of claim 1, wherein the parallel capacitance is a combination of a parasitic capacitance of the first switch and a capacitance of a discrete capacitor in parallel with the first switch between the one end of the first switch and the another end of the first switch.

7. The power converter of claim 1, wherein the input voltage is a first direct current voltage and the output voltage is a second direct current voltage lower than the first direct current voltage.

8. The power converter of claim 1, wherein a turn ratio of the first inductor and the second inductor corresponds to the step down ratio between the input voltage and the output voltage.

9. The power converter of claim 1, wherein the first switch and the second switch are n-type transistors.

10. The power converter of claim 1, wherein the reference voltage is a ground voltage.

11. A power converter to convert an input voltage into an output voltage, the power converter comprising:
switching devices for periodically coupling the input voltage to the output voltage; and
electromagnetically coupled inductors that are commonly implemented as tapped inductors for improving a step down conversion ratio between the input voltage and the output voltage, wherein a parasitic inductance of the electromagnetically coupled inductors is resonated with a capacitance such that the switching devices can be turned on when voltages across the switching devices are approximately zero voltage,
wherein the electromagnetically coupled inductors include:
a first inductor to receive the input voltage; and
a second inductor electromagnetically coupled to the first inductor, the second inductor to supply the output voltage to a load;
and wherein the switching devices include:
a first switch coupled between the first inductor and the second inductor, the first switch being switched according to a pulse having a frequency corresponding to a resonant frequency of (i) a series inductance between the first inductor and the second inductor, wherein the series inductance is a combination of a parasitic inductance of the first inductor and an inductance of a discrete inductor coupled in series between the first inductor and the first switch and (ii) the capacitance which is across the first switch; and a second switch coupled to the first switch and the second inductor to supply a reference voltage to the second inductor according to another pulse having the frequency.

12. The power converter of claim 11, further comprising: a driver configured to apply the pulse to the first switch and apply said another pulse to the second switch, the first switch to turn on during a first time period and turn off during a second time period according to the pulse, the second switch to turn off during the first time period and turn on during the second time period according to said another pulse.

13. The power converter of claim 12, wherein the driver is configured to turn on the first switch and turn off the second switch during the first time period, while a voltage at one end of the first switch is substantially equal to a voltage at another end of the first switch.

14. The power converter of claim 13, wherein the first time period is substantially equal to a half of a resonant period, the resonant period being an inverse of the resonant frequency.

15. The power converter of claim 11, wherein the capacitance is a parasitic capacitance of the first switch or a combination of the parasitic capacitance and a capacitance of a discrete capacitor in parallel with the first switch between the first inductor and the second inductor.

16. A method for converting an input voltage into an output voltage, comprising:
controlling switching devices for periodically coupling the input voltage to the output voltage;
interposing electromagnetically coupled inductors for improving a step down conversion ratio between the input voltage and the output voltage, wherein interposing the electromagnetically coupled inductors includes commonly implementing first and second inductors as tapped inductors such that the second inductor is electromagnetically coupled to the first inductor; and
configuring a parasitic inductance of the electromagnetically coupled inductors so as to resonate with a capacitance such that the switching devices can be turned on when voltages across the switching devices are approximately zero voltage,
wherein the electromagnetically coupled inductors include:
the first inductor to receive the input voltage; and
the second inductor electromagnetically coupled to the first inductor, the second inductor to supply the output voltage to a load;
and wherein the switching devices include:
a first switch coupled between the first inductor and the second inductor, the first switch being switched according to a pulse having a frequency corresponding to a resonant frequency of (i) a series inductance between the first inductor and the second inductor and (ii) the capacitance which is across the first switch, and wherein the series inductance is a combination of a parasitic inductance of the first inductor and an inductance of a discrete inductor coupled in series between the first inductor and the first switch; and
a second switch coupled to the first switch and the second inductor to supply a reference voltage to the second inductor according to another pulse having the frequency.

* * * * *